Dec. 24, 1957

D. D. PEEBLES 2,817,593

STERILIZER

Filed Sept. 14, 1953

INVENTOR.
David D. Peebles
BY
*Fisher & Swain*
ATTORNEYS

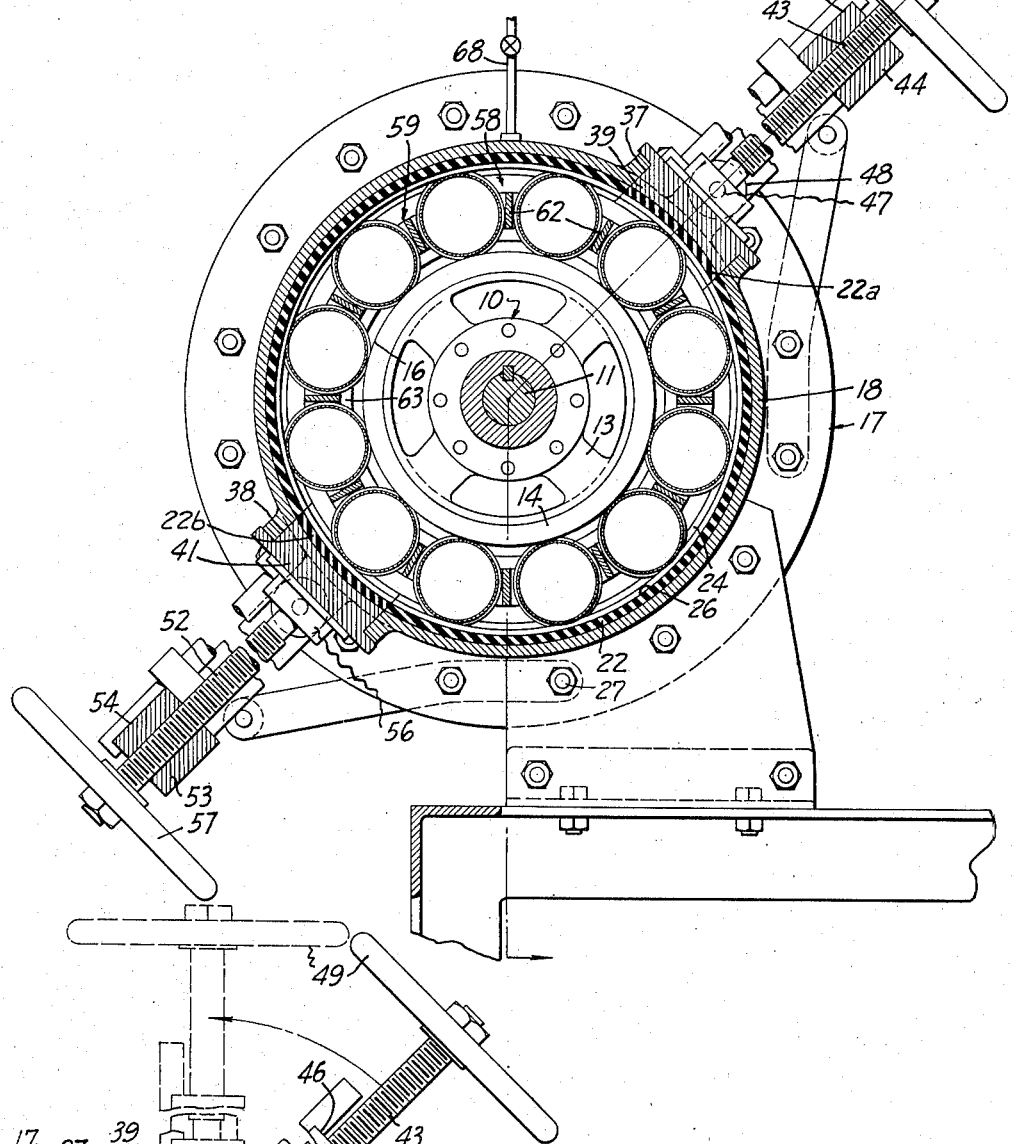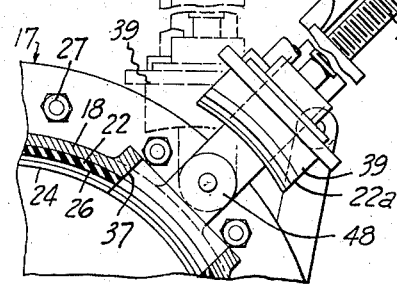

Dec. 24, 1957 D. D. PEEBLES 2,817,593
STERILIZER
Filed Sept. 14, 1953 4 Sheets-Sheet 3

FIG_4_

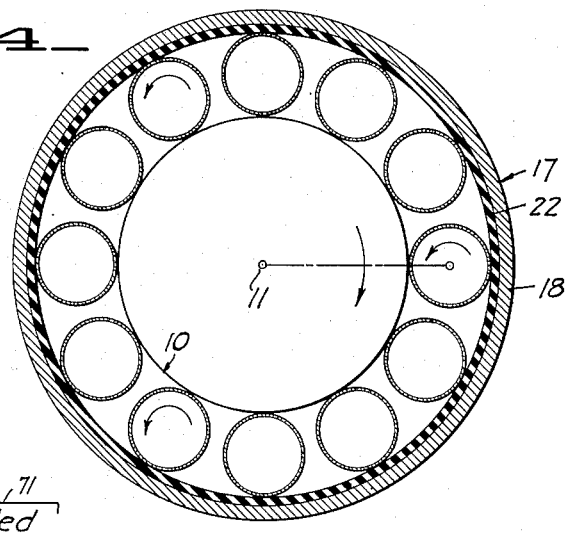

Cans
↓
| Sterilizer loaded with cans & closed | 71 |

↓
| Vacuum applied to remove air | 72 |

↓
| Rotation started & steam applied with initial venting off of remaining air | 73 |

↓
| Contents of cans rapidly heated to sterilizing temperature | 74 |

↓
| Compressed air applied & cold water introduced to rapidly cool the cans. | 75 |

↓
| Water drained off & cans removed | 76 |

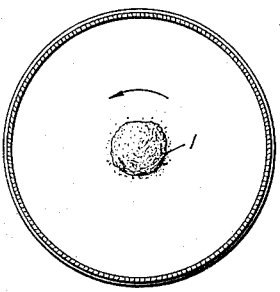
-A-

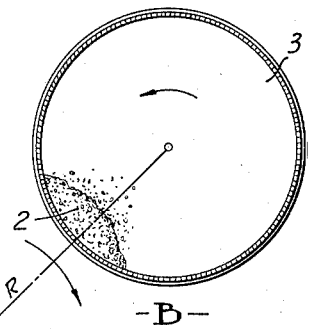
-B-

FIG_5_

FIG_6_

INVENTOR.
David D. Peebles
BY
ATTORNEYS

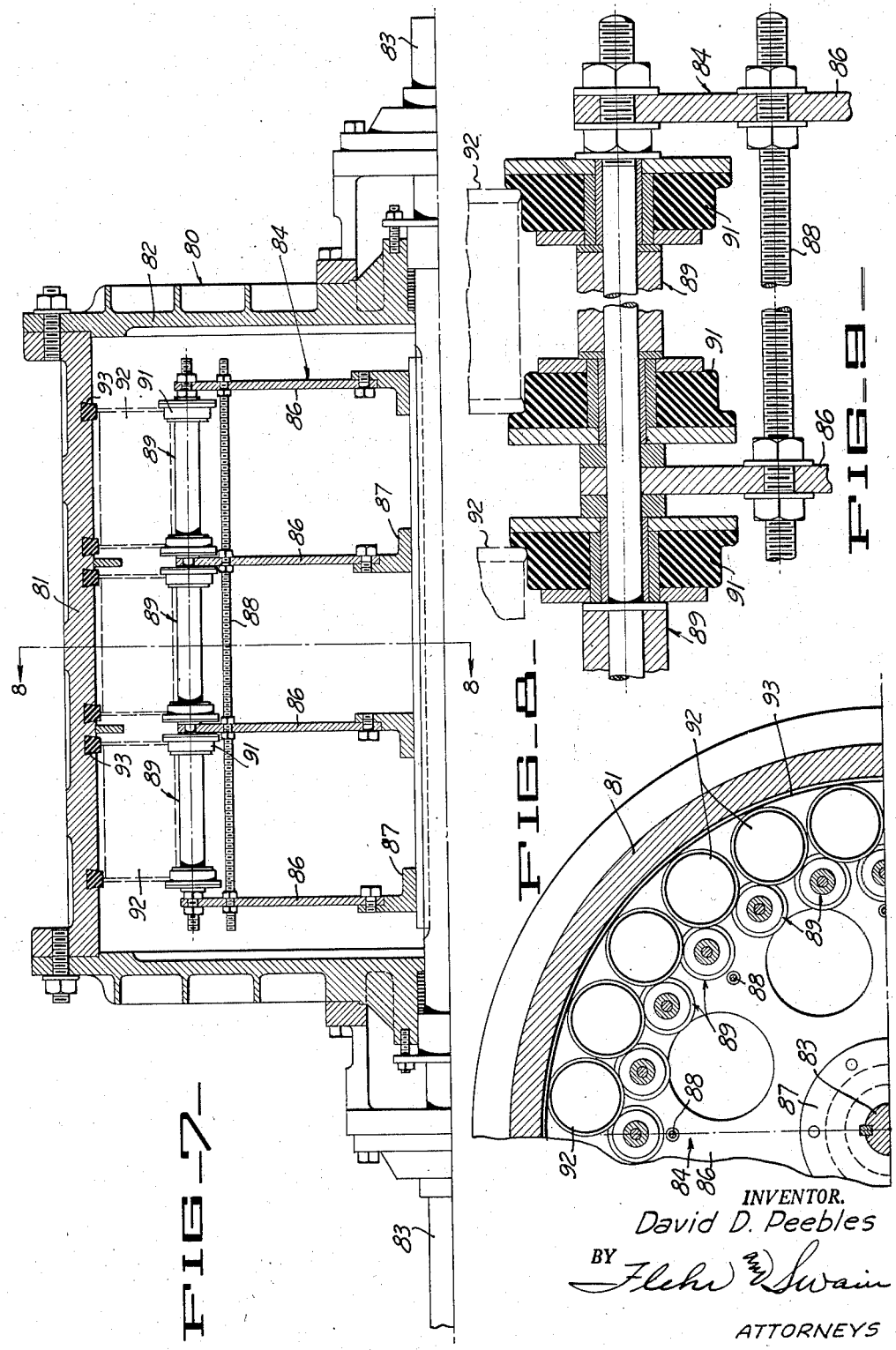

United States Patent Office 2,817,593
Patented Dec. 24, 1957

2,817,593

STERILIZER

David D. Peebles, Davis, Calif., assignor, by mesne assignments, to Foremost Dairies, Inc., San Francisco, Calif., a corporation of California Application September 14, 1953, Serial No. 380,013

8 Claims. (Cl. 99—214)

This invention relates generally to methods and apparatus for the heat sterilization of various food products. It is particularly applicable to the heat sterilization of products after they have been sealed in tin cans or like containers.

In the canning industry it is conventional practice to introduce food products into tin cans or like containers, after which the cans are sealed and introduced into a retort for heat sterilization. In the retorting equipment the cans are heated to a temperature of the order of 240° F., for a period of about 15 to 85 minutes. Thereafter the cans are cooled by immersing them in cool water. Certain types of food products are not detrimentally affected by such sterilizing treatment. However, many products have heat sensitive components which are detrimentally affected by the prolonged heating to such high temperatures, as for example materials such as whole or evaporated dairy milk.

The prolonged time period of heat treatment for effective sterilization is deemed essential when using conventional retorting equipment, because of the poor rate of heat transfer from the metal walls of the can to the contents. This relatively poor heat transfer greatly extends the time period necessary to raise the temperature of the contents of the can to a sterilizing level, and it causes uneven and localized overheating of the material. When processing cans containing whole or evaporated milk, such conventional treatment results in caramelization of lactose, with a noticeable deepening of the color, and the development of a cooked off-flavor.

It has been proposed to reduce the over-all time period of heat treatment for sterilization by applying flash sterilization to the material before it is introduced into the cans, and then introducing the material into the cans, and sealing the cans, under sterile conditions. While the application of this method has resulted in an improvement in the heat sterilization of materials like milk, it is subject to the serious objection that it requires special equipment for both sterilization and for the can filling and sealing operations. Also with such a method there may be an opportunity for bacterial contamination before the cans are sealed.

It is an object of the present invention to provide a new method for the heat sterilization of food products, which will permit sterilization after the material has been introduced into sealed cans, and which will provide relatively rapid and efficient heat transfer, thereby effectively shortening the overall time period of heat treatment.

Another object of the invention is to provide a method and apparatus of the above character which will result in an improvement in the sterilized product, particularly with respect to its color and flavor.

Another object of the invention is to provide a method and apparatus of the above character which can be readily applied to canning plants having conventional canning methods and equipment, and which will take the place of the conventional retorting equipment for heat sterilization.

Another object of the invention is to provide a method and apparatus of the above character which makes use of special centrifugal effects to enable a rapid rate of heat transfer from the walls of a can to the contents.

Additional objects and features of the invention will appear from the following description in which the preferred embodiment of the invention has been set forth in detail in conjunction with the accompanying drawing.

Referring to the drawing:

Figure 2 is an elevation in section, looking from right to left as the machine is illustrated in Figure 1.

Figure 3 is a detail illustrating the closures and the operating means for the same.

Figure 4 is a schematic diagram illustrating the manner in which the cans are rotated.

Figure 1:
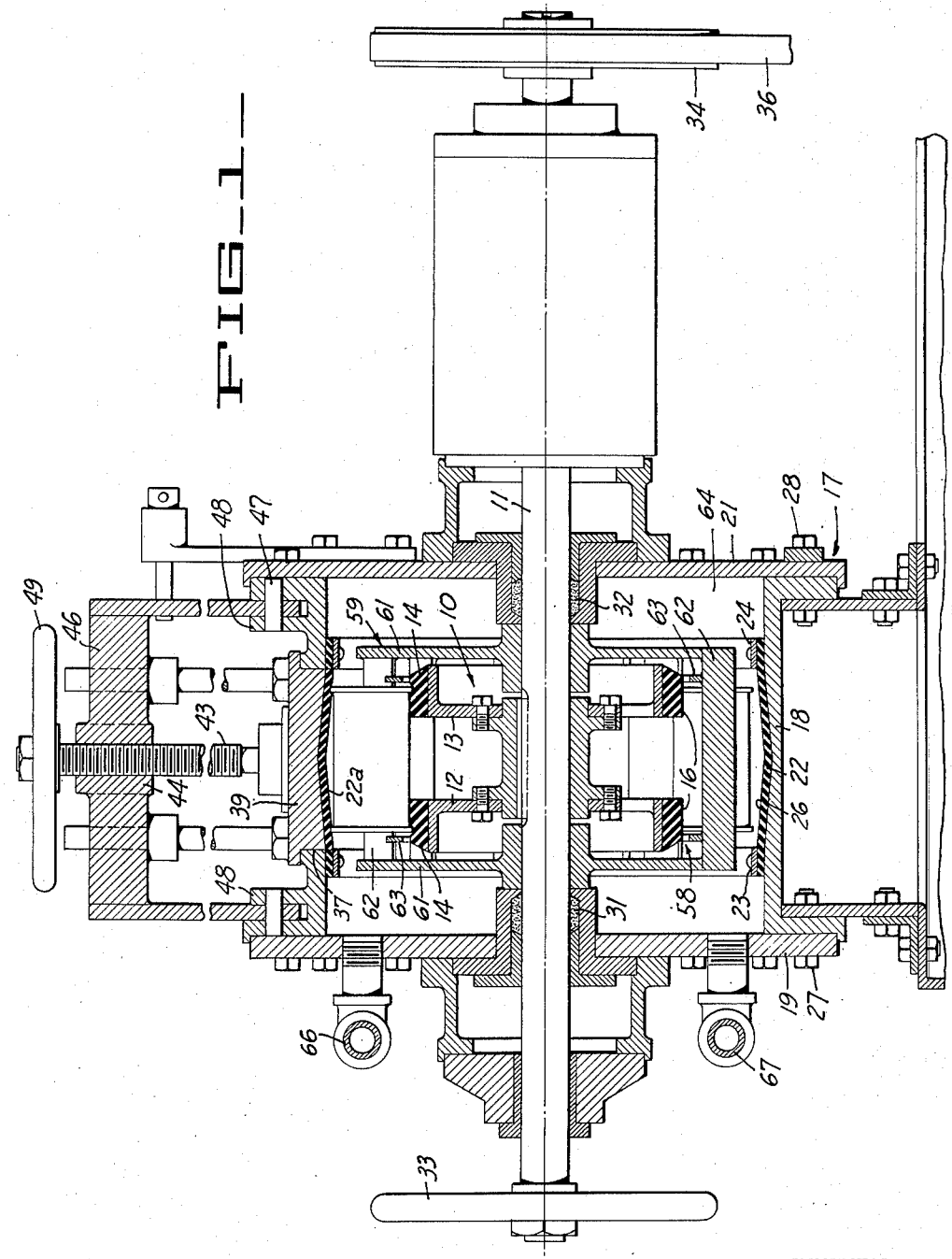
Figure 1 is a side elevational view in section, illustrating a machine incorporating the present invention.

Figures 5A and B are schematic views illustrating the disposition of material within a can, while rotation is being applied.

Figure 6 is a flow sheet illustrating successive steps for commercial use of my method.

Figure 7 is a cross sectional view illustrating another embodiment of the invention.

Figure 8 is a cross sectional detail on an enlarged scale taken along the line 8—8 of Figure 7.

Figure 9 is a detail in section showing the manner in which cans are engaged in the embodiment of Figure 7.

In practicing my method, a food product, such as whole or condensed dairy milk, is processed according to present procedures, and then is introduced into cans and the cans sealed, by the use of conventional can filling and sealing equipment. The cans are then enveloped in a fluid heating medium, such as steam, and rotated in such a manner that they are spun about their individual axes, while simultaneously being rotated about a second axis displaced laterally from the axes of the cans. This method of rotation produces certain centrifugal effects which cause almost instantaneous transfer of heat from the walls of the can to the entire contents. The temperature of the contents of the can is thus brought rapidly to the desired sterilizing level, and maintained at such temperature for a sufficient period for proper sterilization. Thereafter the fluid heating medium is removed, and for rapid cooling, the cans can be sprayed or immersed in water or like cooling liquid, while the rotation is continued.

While various types of apparatus can be used for carrying out the present method, the apparatus disclosed herein is arranged to accommodate a plurality of cans, and is adapted to apply the necessary rotation while the cans are being enveloped in the fluid heating medium.

Referring first to the machine or apparatus illustrated particularly in Figures 1 to 3 inclusive, it consists of a rotor 10, mounted upon the shaft 11. The rotor can be made of two wheels 12, which are provided with surface layers 14 of synthetic rubber or like resilient material. Thus peripheral surfaces 16 are formed which are adapted to frictionaly engage the cans.

Surrounding the rotor there is a housing 17 which includes the body part 18, and the end or head plates 19 and 21. The body part 18 is made in cylindrical form, and its inner periphery is covered with a layer 22 of resilient material, such as synthetic rubber. This layer of rubber can be suitably bonded to the inner surface of the body 18, and in addition the end margins can be secured to the body by the clamping rings 23 and 24. It is desirable that the inner surface of the body 18, in section, be slightly concave as illustrated in Figure 1, and that the inner peripheral surface 26, provided by the rubber surfacing 22, be similarly concave.

The end plates 19 and 21 can be secured to the body 18 by suitable means such as the bolts or screws 27 and 28, with application of suitable gaskets to provide fluid tight joints.

The shaft 11 extends through the end plates, and through the packing glands 31 and 32 which prevent shaft leakage. One end of the shaft can be provided with a hand wheel 33 for manual turning. The other end of the shaft is shown provided with a pulley wheel 34, for engaging the driving belt 36.

The body part is provided with the openings 37 and 38 (Figure 2) for introducing and removing cans. These openings can be generally rectangular, of ample size to pass the cans, and they extend through the rubber surfacing 22. Closures 39 and 41 normally occupy these openings during operation of the machine. Closure 39 can consist of a flanged body which has its inner face surfaced with the resilient rubber 22a, whereby it continues the trackway formed by the body. As suitable means for clamping this closure in closed position, and for opening it to permit access to cans, I have shown a threaded rod 43, which has its one end attached to the body 39. This rod has threaded engagement with the nut 44, and the nut is carried by the yoke 46. The yoke has a pivotal connection 47 with the supporting arms 48. By turning the hand wheel 49, which is attached to rod 43, the closure 39 can be retracted from the opening 38, and then swung to an out-of-way position.

Closure 41 is formed in the same manner as closure 39, and is provided with an inner rubber surfacing 22B. It is similarly attached to the threaded rod 52, which has threaded engagement with the nut 53, carried by the yoke 54. The yoke is pivotally attached to the supporting arms 56. By turning the hand wheel 57 the closure 41 can be removed or applied.

When the closure 39 is removed from the opening 37, a plurality of cans can be introduced into the annular space or trackway 58 which is formed between the outer periphery of the rotor, and the inner periphery of the stator body 18. The cans are placed with their individual axes parallel to the axis of the shaft 11. The dimensioning is such that each can is frictionally engaged with the rubber surfacing 14 and 22, on diametrically opposite areas. The frictional engagement is accompanied by some slight indentation of the rubber by the end rims of the cans, as illustrated in Figure 1.

In conjunction with the parts described above it is desirable to provide means for maintaining the cans circumferentially spaced. Rotary spacing means for this purpose is designated generally at 59, and can consist of the discs or wheels 61, which are loosely journaled upon shaft 11, and which are connected by the circumferentially spaced bars 62. These bars are disposed to intervene between the successive cans, as illustrated in Figure 2. The bars 62 carry the rings 63, which are arranged to be in proximity with the ends of the cans, as shown in Figure 1. Spacing means 59 is free to rotate about the axis of the shaft 11, and also permits rapid rotation or spinning of each can about its individual axis.

The interior of the housing 17 provides a chamber 64 which is normally sealed with respect to the atmosphere, and is adapted to contain heating or cooling fluid. Pipes 66 and 67 make connection with the interior of the housing, as for example through the end wall 19, and are connected with suitable auxiliary apparatus (not shown) for applying and removing fluids as will be presently explained. Another pipe 68 can be provided for removing air.

Operation of the apparatus described above can be described as follows: The closure 39 is removed from the opening 38, and cans are placed within the machine in the manner illustrated in Figure 2, and between the separating bars 62. Thereafter the closure 39 is clamped in place so that the interior of the housing is sealed with respect to the atmosphere. Shaft 11 is now rotated at a suitable speed, whereby the rotor 10 turns relative to the stationary housing. Each can is frictionally engaged at diametrically opposite areas with the rotor and the rubber surfacing 22 of the housing. Thus each can is caused to rotate (i. e. spun) at a relatively rapid rate on its own axis, while at the same time each can rotates about the axis of the shaft 11. By way of example the speed of rotation of each can about its own axis can be of the order of 1000 R. P. M., and the speed of rotation of the shaft 11 about 600 R. P. M. In conjunction with or immediately after starting the shaft 11 in rotation, steam is applied to the interior of the housing through the pipe 66. By way of example the steam can be at a temperature of the order of 280° F., and at a pressure of the order of 38 p. s. i. Because of the centrifugal effects which will presently be described, heat transferred to the metal walls of the cans is rapidly and efficiently transferred to the entire contents of each can, thus flashing the contents of the can up to a temperature of the order of 260° to 300° F.

The manner in which the cans are rotated during heating is illustrated schematically in Figure 4. Each can is spun about its individual axis, while at the same time the cans rotate about the axis of the shaft.

Figures 5A and 5B illustrate more clearly what happens when a spinning can rotates about a fixed or slowly moving axis, as distinguished from the double rotation about two axes. In both Figures 5A and 5B it is assumed that the can has a transparent end which enables one to view the contents during the spinning action. When a can is at rest, with its axis horizontal, the air space which is always present, extends along the upper side of the can above the contents. Now as the can is rotated about its axis at a speed of the order of 1000 R. P. M., the air space tends to form a bubble in the form of a hollow tube 1 extending axially through the can, as the body of liquid picks up rotation. This is illustrated in Figure 5A.

When the spinning can is rotated about a second axis, as schematically illustrated in Figure 5B, the effect is totally different. There is no longer a distinct air bubble or pocket. However there is an aerated zone 2 which remains upon that side of the can which is faced toward the second axis of rotation. The main interior 3 of the can is occupied by dense liquid material which is substantially free of bubbles or aerated material, and which has direct and intimate contact with the side walls of the can without an intervening bubble film. Rotation about the second axis causes centrifugal effects within the can which tend to restrain rotation of the contents relative to the radius R. This causes a condition of intense turbulence within the can, together with effective shearing action between the metal walls and the contents, for highly efficient and rapid heat transfer.

The net effect of the above is to provide highly efficient and rapid heat transfer whereby it is possible to effect substantially flash sterilization, with almost instantaneous elevation of the temperature of the contents of the can to the desired sterilizing temperature, whereby the over-all heating cycle can be reduced to a minimum period of time.

By way of example, in one particular instance the apparatus constructed as previously described, was operated to sterilize whole dairy milk in No. 1 tall cans. These cans measured two and eleven-sixteenths inches in diameter, and four and fourteen-sixteenths inches in length. They were filled whereby the head space (with the cans vertical and the top head or lid applied) amounted to about 4% of the total volume of the can. The rotor had an effective diameter of 9¼ inches, and was rotated at a speed of 602 R. P. M., whereby each can was spun about its individual axis at a speed of 1030 R. P. M. Applying steam at 24 p. s. i. g., the contents of the cans were heated from an initial 56° F. to 228° F. in 15 seconds to 256° F. in 30 seconds, 260° F. in 45 seconds, and to 264° F. in 60 seconds. For steam at 27 p. s. i. g., the contents of the cans were heated from an initial 56 F. to 262° F. in 30 seconds, to 272° F. in 45 seconds, 272° F. in 60 seconds, and to 272° F. in 75 seconds. Upon applying steam at 38 p. s. i. g., the contents of the cans were heated from an initial 56° F. to 267° F. in 30 seconds, to 279° F. in 45 seconds, 284° F. in 60 seconds, and to 284° F. in 75 seconds. At the speeds of rotation mentioned above, centrifugal force on the contents of the can due to rotation about the second axis was about 9.8 times gravity (i. e. 9.8 g.). It is anticipated that more or less of such centrifugal force can be used, depending upon such factors as the character of the containers and the material being sterilized. In general for the more common types of cans, rotation about the second axis can involve centrifugal forces ranging from about 5 to 12 g., while rotation about the axis of the can may range from 500 to 2500 R. P. M.

It will be evident from the figures cited above that sterilizing temperatures can be attained in a matter of seconds, without detrimental localized heating.

The method is somewhat critical with respect to the amount of head space in the can, and therefore the head space should remain constant and of a value (in terms of percent of total can volume) such as will provide optimum heating. With liquid whole milk the 4% space previously specified gave optimum results.

When using the apparatus of Figures 1 to 3, it is desirable to make use of a complete procedure as set forth in the flow sheet of Figure 6. The first step 71 is to load the equipment with the filled and sealed cans, after which the housing is closed. In the next step 72 vacuum is applied to the interior of the housing to remove air. A vacuum pump for this purpose can be connected to pipe 66 through suitable valving (not shown), and in a typical instance the vacuum pulled can be of the order of 27 inches of mercury. In the next step 73 the rotor is started in operation, and steam is applied with initial venting off of the remaining air from the chamber. The air can be vented off by temporarily opening the pipe 68. Steam is supplied to the pipe 66 through suitable pressure reducing regulating equipment and valving (not shown). A valve connected to pipe 67 is opened a small amount whereby condensate may drain to a suitable steam trap (not shown). Heat transfer to the cans commences immediately after steam is applied and continues as the steam pressure rises to a predetermined value. At the end of the heating cycle the chamber is connected to a source of compressed air, and cold water is introduced into the chamber to flood the cans. Compressed air can be introduced through valving connected to the same piping 66, and should be at a pressure corresponding generally to the steam pressure, thereby avoiding sudden reduction in pressure upon the cans during cooling. Rotation of the cans is continued during the cooling cycle, and as the cans contact the cool water the temperature of the contents of the cans rapidly falls to substantially the temperature of the water. The rapid heat transfer previously described makes possible efficient and rapid cooling. After the cans have cooled the water is drained from the chamber as indicated at 76, and the cans are removed.

In a typical operation making use of the apparatus as described, including the dimensions and speeds of rotation previously mentioned by way of example, is as follows: Steam is applied whereby the pressure builds up rapidly from atmospheric to 38 p. s. i., over a period of 20 seconds, and then held at this pressure for a sufficient length of time for the contents to reach a predetermined temperature, such as 265° F. in a total of 45 seconds. At the end of this time steam is removed from the chamber while compressed air and water are being introduced. The over-all time period starting with initial introduction of steam and ending with completion of cooling, can be about 2½ minutes.

The example just stated has particular reference to cans which are filled with whole dairy milk. It will be evident that one must properly modify the time periods and temperatures for various types of materials which may be handled. Thus with an increase in viscosity, it is necessary to somewhat extend the heating cycle to attain the same temperatures for a corresponding steam pressure.

Application of my method results in a marked improvement in the sterilized product. Materials which have components sensitive to heat treatment, such as whole or evaporated dairy milk, are not detrimentally affected as to color or flavor. There is no noticeable deepening of the color due to carmelization of lactose, and there is a remarkable absence of cooked and off flavors, such as are developed by conventional sterilization.

It will be evident that my invention can be applied to a wide variety of food products, provided however that the products are of such a character that solids contained therein are not injured by the treatment. In general the invention can be applied to all liquid food products, and also to semi-liquid materials and slurries or suspensions, such as soups and soup stocks, fruit juices, vegetables such as peas, and the like. In addition to heating for sterilizing my machine can be used for quick cooling or chilling operations, by the use of a refrigerated liquid medium in the housing chamber.

Figures 7 to 9 inclusive illustrate another embodiment of my apparatus. The housing 80 in this instance comprises the main body part 81 and the end plates 82. The rotatable shaft 83 carries a rotor 84 provided with roller means for engaging the cans. The rotor is fabricated from the axially spaced metal discs 86, which are carried by the shaft hubs 87 and laterally interconnected by the rods 88. The discs 86 serve to mount a plurality of rows of circumferentially spaced rollers 89. Each roller is provided with flanged rubber collars 91 that are adapted to engage the end portions of cans 92 in the manner illustrated in Figure 9.

The inner peripheral surface of the housing body 81 is provided with resilient rubber insert strips 93 that likewise are adapted to engage the end portions of the can 92.

The circumferential spacing of the rollers 89 is such that the collars 91 of adjacent rollers engage a can at arcuately spaced points thereon, thereby maintaining a fixed axial spacing between adjacent cans such that the cans are spaced a short distance apart as illustrated particularly in Figure 8. Assuming that the cans are held between the rubber collars 91 and the strips 93, it is evident that upon turning the rotor 84, all of the cans are caused to rotate about their individual axes while at the same time they rotate about the axis of the shaft 83.

With the embodiment of Figures 7 to 9 inclusive, suitable provision is made for introducing and discharging the cans, and for introducing heat transfer fluid, the same as for the previously described embodiment.

I claim:

1. In a method for the treatment of food products in containers, the steps of spinning the container about its axis, simultaneously rotating the container about an axis spaced laterally from the first axis, said last rotation being at a speed capable of causing centrifugal force to be exerted within the container of the order of five times gravity or more, and supplying heat to the walls of the container while the container is so rotated, the rotation of the container serving to effect rapid heat exchange through the walls of the container and with respect to the product therein.

2. In a method for the treatment of food products in containers, the steps of spinning the container about its axis simultaneously rotating the container about an axis spaced laterally from the first axis, said last named rotation being at a speed sufficient to exert centrifugal force on the contents of the container of the order of five times gravity or more, and enveloping the container in a fluid medium to effect a heat transfer through the walls of the container while the container is so rotated, the rotation of the container serving to effect rapid heat transfer through the walls of the container to rapidly change the temperature of the product therein.

3. A method as in claim 2 in which the fluid medium is a heating medium and in which the container after being rotated in said fluid heating medium, is rotated in a fluid cooling medium to effect rapid cooling of the contents of the container.

4. In a method for the sterilization of food products in tin cans of the type ordinarily used for the marketing of sterilized food products, the steps of spinning the can about its axis, simultaneously rotating the can about an axis parallel to and spaced laterally from the first axis, said first named rotation being at a speed of the order of from 500 to 2500 R. P. M., and the second named rotation being at a speed sufficient to exert centrifugal forces of the order of from 5 to 12 g., and enveloping the cans in a fluid heating medium while the container is being so rotated, rotation of the container serving to effect rapid heat transfer from the walls of the container to the product therein, whereby the product is heat sterilized.

5. In apparatus for the treatment of food products in sealed tin cans, a rotor having a circular can engaging surface on its outer periphery, means surrounding the rotor and having an inner circular can engaging surface spaced from the outer periphery of the rotor, the radial spacing between said peripheral surfaces being such that the cans when disposed between the same are each frictionally and continuously engaged on radially spaced areas, means for rotating the rotor relative to the stator whereby the cans are spun about their individual axes and simultaneously rotated about the axis of the rotor, and means forming a housing serving to enclose the rotor and the cans, said housing being adapted to receive a fluid heat transfer medium.

6. Apparatus as in claim 5 together with means for introducing and removing cans with respect to said housing.

7. Apparatus as in claim 5 together with means for maintaining the cans in circumferentially spaced relationship with respect to each other.

8. Apparatus as in claim 5 in which the rotor carries a plurality of circumferentially spaced rollers for engaging the cans, the rollers being spaced whereby each can is engaged by two rollers.

References Cited in the file of this patent
UNITED STATES PATENTS

| | | |
|---|---|---|
| 1,331,337 | Fooks | Feb. 17, 1920 |
| 1,354,962 | Fooks | Oct. 5, 1920 |
| 1,391,953 | Hansen | Sept. 27, 1921 |
| 2,322,693 | Kennedy | June 22, 1943 |
| 2,372,239 | Whitaker | Mar. 7, 1945 |
| 2,536,115 | Wilbur | Jan. 2, 1951 |
| 2,569,645 | Vial | Oct. 2, 1951 |